(12) United States Patent
Mak et al.

(10) Patent No.: US 12,403,794 B2
(45) Date of Patent: Sep. 2, 2025

(54) ELECTRIC VEHICLE BATTERY UNIT AND BATTERY UNIT INSTALLATION METHOD

(71) Applicant: Dana Heavy Vehicle Systems Group, LLC, Maumee, OH (US)

(72) Inventors: Chris Mak, Markham (CA); Joel Roeleveld, Hamilton (CA)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 570 days.

(21) Appl. No.: 17/660,726

(22) Filed: Apr. 26, 2022

(65) Prior Publication Data

US 2022/0348066 A1    Nov. 3, 2022

Related U.S. Application Data

(60) Provisional application No. 63/181,090, filed on Apr. 28, 2021.

(51) Int. Cl.
*B60K 1/04* (2019.01)
*B60K 1/00* (2006.01)
(Continued)

(52) U.S. Cl.
CPC ............... *B60L 58/33* (2019.02); *B60K 1/00* (2013.01); *B60K 1/04* (2013.01); *B60K 11/06* (2013.01); *B60L 1/003* (2013.01); *B60L 50/75* (2019.02); *B60L 53/22* (2019.02); *B60L 58/18* (2019.02); *B60L 58/26* (2019.02); *B60L 58/30* (2019.02); *B60L 58/40* (2019.02); *B60R 16/0238* (2013.01); *H01M 8/04007* (2013.01); *H01M 8/04302* (2016.02); *H01M 8/04303* (2016.02);
(Continued)

(58) Field of Classification Search
CPC .......... B60L 50/66; B60L 50/60; B60L 58/26; H01M 10/613; H01M 10/625; H01M 50/10; H01M 2220/20; B60K 2001/0405; B60K 1/04
See application file for complete search history.

(56) References Cited

U.S. PATENT DOCUMENTS

| 4,931,947 A | 6/1990 | Werth et al. |
| 6,448,535 B1 | 9/2002 | Ap |

(Continued)

FOREIGN PATENT DOCUMENTS

| DE | 102019008255 A1 | 6/2020 |
| EP | 2581249 A1 | 4/2013 |
| JP | 2003257441 A | 9/2003 |

*Primary Examiner* — Jason D Shanske
*Assistant Examiner* — James J Triggs
(74) *Attorney, Agent, or Firm* — McCoy Russell LLP

(57) ABSTRACT

An electric vehicle (EV) battery unit and installation method is provided herein. The EV battery unit includes a modular housing with a central section with batteries positioned therein and a first lateral section with a battery cooler that is designed to reduce a temperature of the batteries and an inverter that is positioned therein and electrically coupled to the batteries. The modular housing further includes a first frame attachment interface profiled to attach to a first longitudinal frame rail in an EV and a second frame attachment interface profiled to attach to a second longitudinal frame rail in the EV, where the batteries are positioned laterally between the first and second frame attachment interfaces.

14 Claims, 11 Drawing Sheets

(51) Int. Cl.
    *B60K 11/06*     (2006.01)
    *B60L 1/00*     (2006.01)
    *B60L 50/75*     (2019.01)
    *B60L 53/22*     (2019.01)
    *B60L 58/18*     (2019.01)
    *B60L 58/26*     (2019.01)
    *B60L 58/30*     (2019.01)
    *B60L 58/33*     (2019.01)
    *B60L 58/40*     (2019.01)
    *B60R 16/023*     (2006.01)
    *H01M 8/04007*     (2016.01)
    *H01M 8/04302*     (2016.01)
    *H01M 8/04303*     (2016.01)
    *H01M 8/0432*     (2016.01)
    *H01M 8/04537*     (2016.01)
    *H01M 8/04955*     (2016.01)
    *H01M 10/48*     (2006.01)
    *H01M 10/613*     (2014.01)
    *H01M 10/625*     (2014.01)
    *H01M 16/00*     (2006.01)
    *H01M 50/249*     (2021.01)

(52) U.S. Cl.
CPC ..... *H01M 8/0432* (2013.01); *H01M 8/04626* (2013.01); *H01M 8/04955* (2013.01); *H01M 10/48* (2013.01); *H01M 10/613* (2015.04); *H01M 10/625* (2015.04); *H01M 16/006* (2013.01); *H01M 50/249* (2021.01); *B60K 2001/005* (2013.01); *B60K 2001/0405* (2013.01); *B60K 2001/0494* (2013.01); *B60L 2210/10* (2013.01); *B60L 2240/12* (2013.01); *B60L 2240/36* (2013.01); *B60L 2240/54* (2013.01); *H01M 2220/20* (2013.01); *H01M 2250/20* (2013.01)

(56) References Cited

U.S. PATENT DOCUMENTS

| | | |
|---|---|---|
| 6,580,977 B2 | 6/2003 | Ding et al. |
| 7,252,166 B2 | 8/2007 | Kubusch et al. |
| 7,273,120 B2 | 9/2007 | Tabata |
| 7,434,611 B2 | 10/2008 | Wunderlich et al. |
| 7,543,454 B2 | 6/2009 | Harris |
| 7,810,595 B2 | 10/2010 | Moran et al. |
| 8,027,759 B2 | 9/2011 | Saeki et al. |
| 8,148,952 B2 | 4/2012 | Schaffnit |
| 8,347,645 B1 | 1/2013 | Miller |
| 8,511,407 B2 | 8/2013 | Jeon et al. |
| 8,602,141 B2 | 12/2013 | Yee et al. |
| 8,822,093 B2 | 9/2014 | Kim et al. |
| 9,895,999 B2 | 2/2018 | Ohashi |
| 10,442,297 B2 | 10/2019 | Brown et al. |
| 10,493,837 B1 * | 12/2019 | Angelo ................ B60L 50/66 |
| 10,957,920 B2 | 3/2021 | Sato et al. |
| 2006/0101645 A1 | 5/2006 | Stone |
| 2011/0136026 A1 | 6/2011 | Betts et al. |
| 2020/0185735 A1 | 6/2020 | Kim et al. |
| 2021/0155224 A1 | 5/2021 | McKibben et al. |
| 2021/0179176 A1 | 6/2021 | Kim |

* cited by examiner

ELECTRIC VEHICLE BATTERY UNIT AND BATTERY UNIT INSTALLATION METHOD

CROSS-REFERENCE TO RELATED APPLICATION

The present application claims priority to U.S. Provisional Application No. 63/181,090, entitled "ELECTRIC POWERTRAIN AND METHOD FOR OPERATION OF SAID POWERTRAIN", and filed on Apr. 28, 2021. The entire contents of the above-listed application are hereby incorporated by reference for all purposes.

FIELD

The present description relates generally to vehicle systems with a battery unit and a method for installation of said battery unit.

BACKGROUND AND SUMMARY

Electric powertrains have previous utilized either battery technology or fuel cells to provide electric energy for a traction motor. Both electric vehicle technologies do not generate hydrocarbon emissions during vehicle operation, which may provide an attractive alternative to vehicles with internal combustion engines when taking into account environmental factors during vehicle design.

US 2021/0155224 A1 to McKibben et al. discloses a heavy duty vehicle with a power distribution system that may include both a traction battery and a fuel cell system for additional energy storage. The traction batteries are positioned on the side of the vehicle in front of the fuel cells and associated cooling system. Further, in McKibben's vehicle, the power distribution unit is spaced away from the batteries and positioned adjacent to the hydrogen gas cylinders.

However, the inventors have identified several drawbacks with McKibben's heavy duty vehicle as well as other electric vehicles. The batteries in McKibben's vehicle may be susceptible to degradation from external factors such as road debris. Further positioning the batteries in front of the hydrogen fuel cell and below the cab poses a number of space constraints on the batteries, which may ultimately constrain the size and energy storage capacity of the battery bank. Still further, positioning the battery bank away from the power distribution unit increases the vehicle's manufacturing complexity and reduces its modularity.

The inventors have recognized the abovementioned challenges and developed an electric vehicle (EV) system to at least partially overcome the challenges. The EV battery unit includes a modular housing with a central section and a first lateral section. The central section includes multiple batteries positioned therein and the first lateral section includes a battery cooler that is designed to reduce the temperature of the batteries. The first lateral section further includes an inverter that is positioned therein and electrically coupled to the batteries. The modular housing includes a first frame attachment interface profiled to attach to a first longitudinal frame rail in an EV chassis and a second frame attachment interface profiled to attach to a second longitudinal frame rail in the EV. In the EV battery unit, the batteries are positioned laterally between the first and second frame attachment interfaces. In this way, a modular battery platform that efficiently mechanically attaches to the EV chassis. Consequently, the adaptability as well as the manufacturing efficiency of the EV is increased.

In one example, the batteries may be positioned between the longitudinal frame rails when the EV battery unit is installed in the EV. Consequently, the chance of battery degradation from the external environment such as road debris is reduced.

Further in one example, the modular housing may further include a second lateral section with one or more distribution boxes that are electrically coupled to the batteries. In such an example, the one or more distribution boxes are designed to electrically couple to a hydrogen fuel cell assembly. In this way, the EV battery unit may achieve more even mass distribution by positioning the distribution boxes and the cooler on opposite sides of the housing. Consequently, drops in the vehicle's handling performance can be avoided. Further, designing the battery unit with the aforementioned fuel cell connection functionality further increases the installation efficiency of the battery unit as well as the unit's adaptability.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A modular electric vehicle (EV) battery system is described herein that achieves a higher level of adaptability and installation efficiency with regard to mounting within the vehicle when compared to previous EV systems. To achieve higher level of installation efficiency in relation to previous battery assemblies with components spaced away from one another, the battery unit includes a continuous housing structure that cradles the batteries in a central section and a cooler, inverter, and/or distribution boxes positioned on opposing lateral sides of the housing. The housing structure includes frame attachment interfaces that extend in a vertical direction and mechanically attach to longitudinal frame rails when the battery unit is installed in the EV. Positioning these components on opposing sides of the housing allows the unit to achieve a more even weight distribution, which avoids a substantial decrease in the vehicle's handling performance when compared to battery assemblies with a greater mass distribution imbalance.

Figure 1:
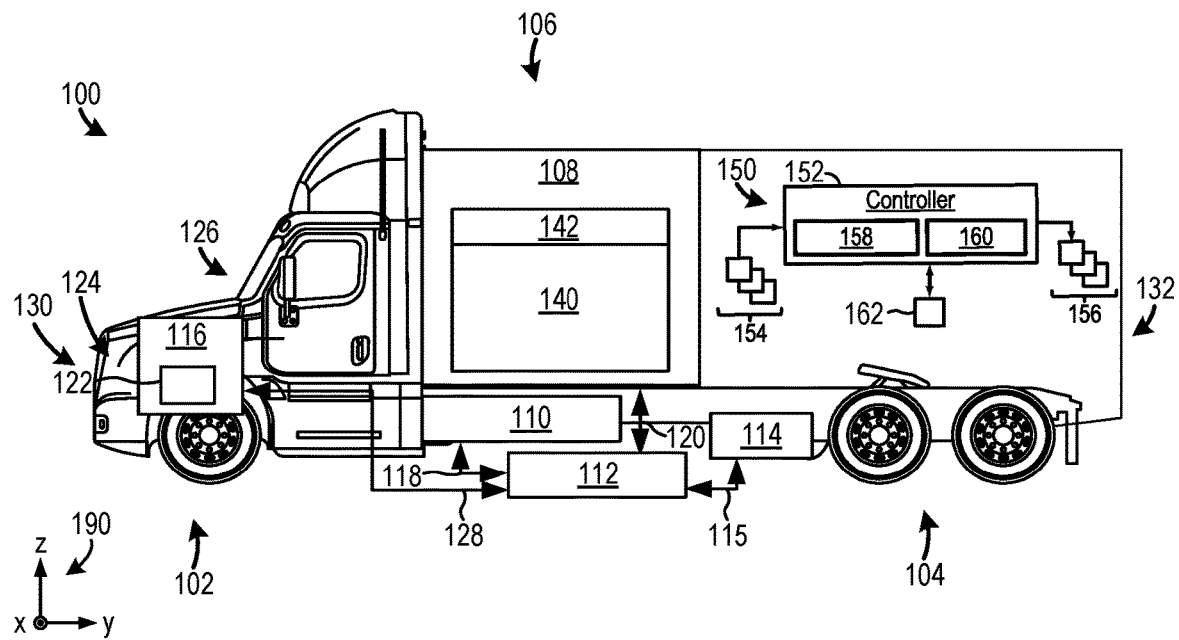
FIG. 1 shows an illustration of an electric vehicle (EV) with modular electric propulsion system components that are schematically depicted.
Figure 2:
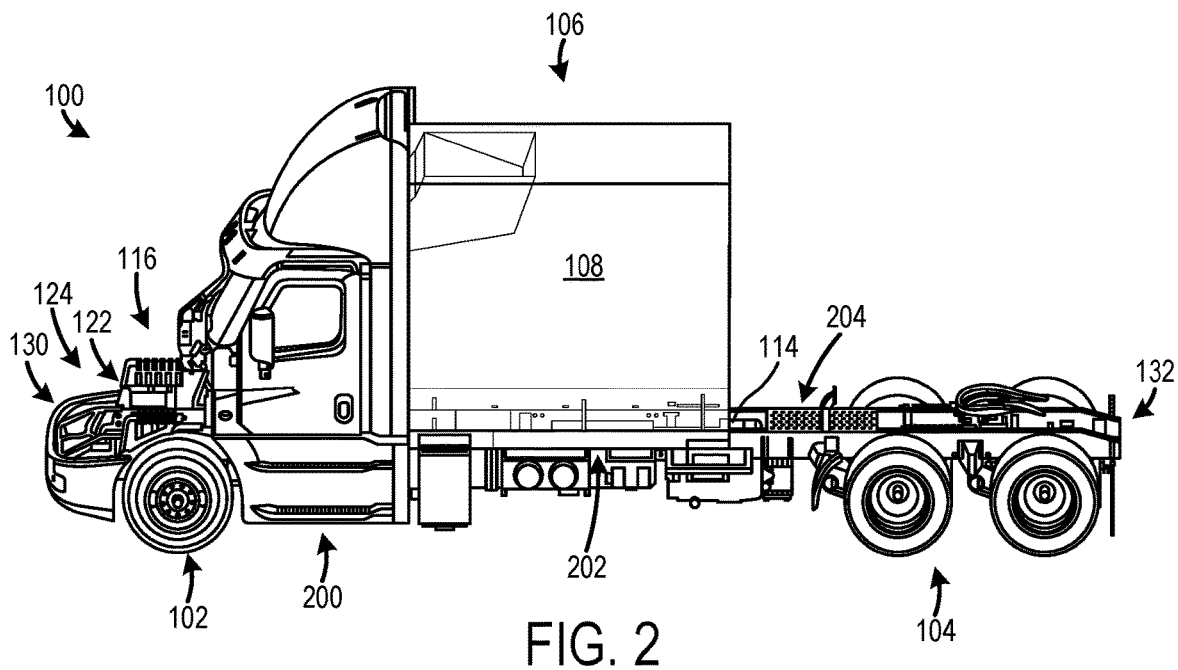
FIG. 2 shows an illustration of the EV, depicted in FIG. 1, with exemplary detailed illustrations of the electric propulsion system components.
Figure 3:
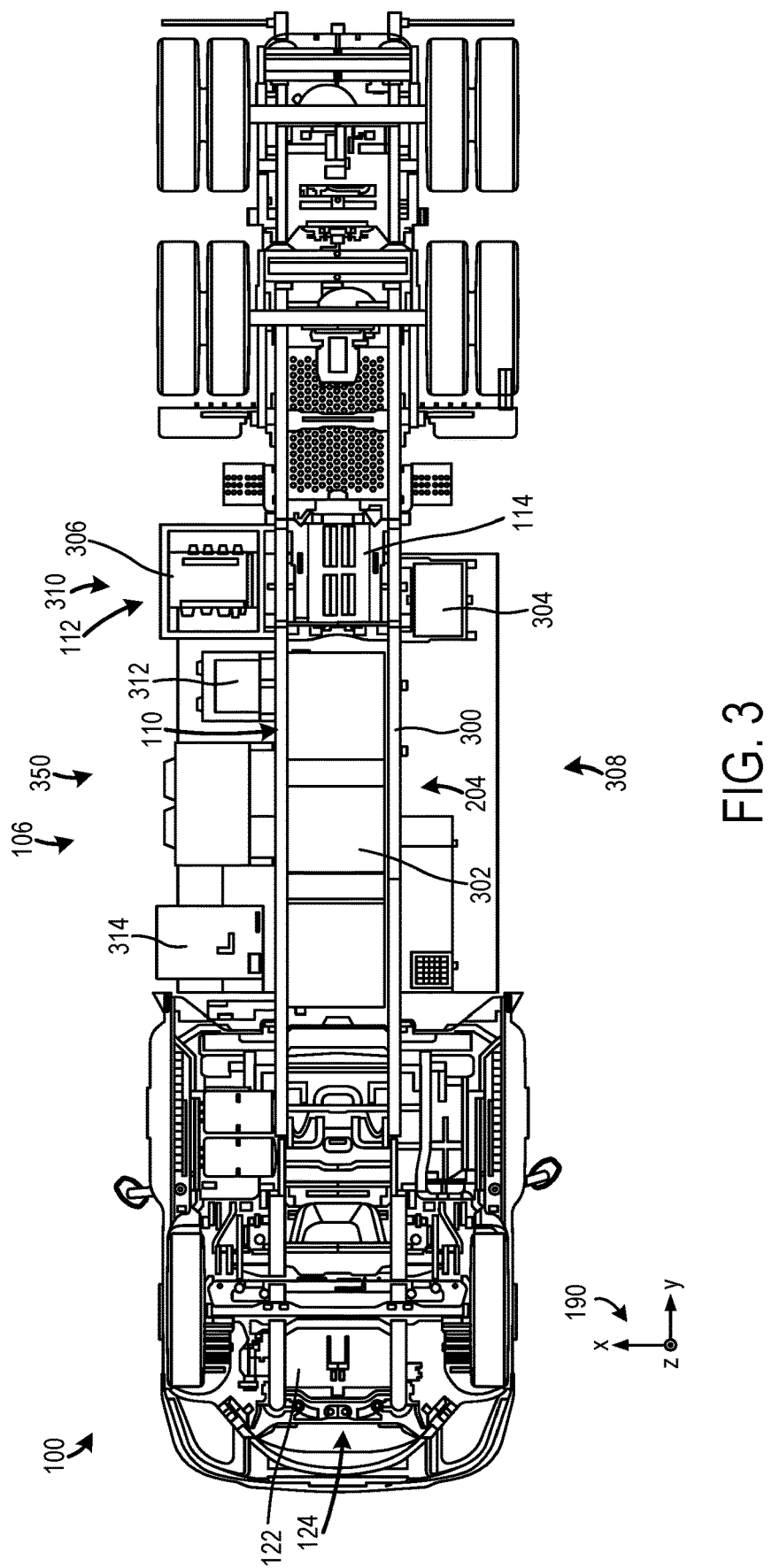
FIG. 3 shows a bottom view of the EV, depicted in FIG. 2.
Figure 4:
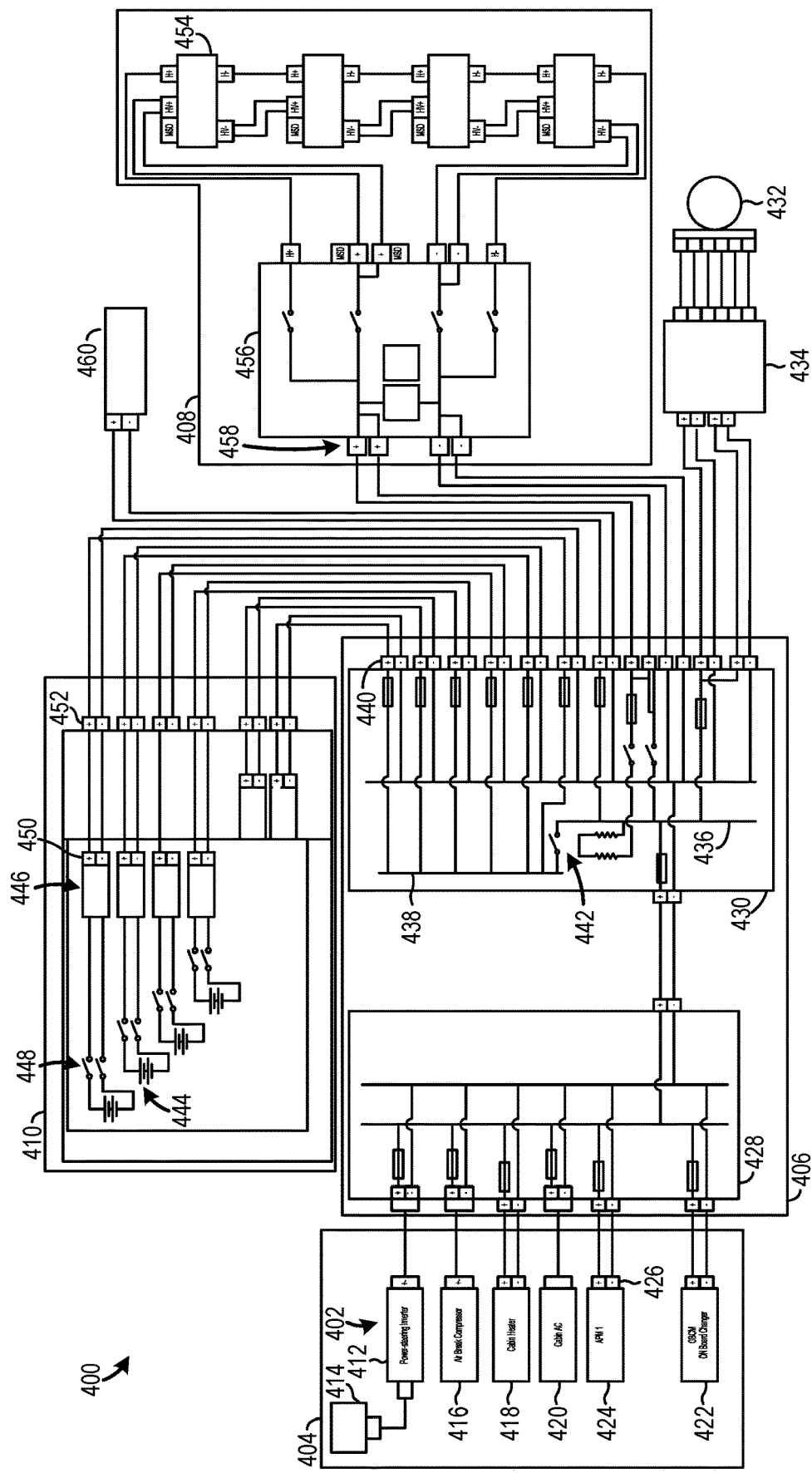
FIG. 4 shows a diagram of an electrical circuit in an EV system.
Figure 18:
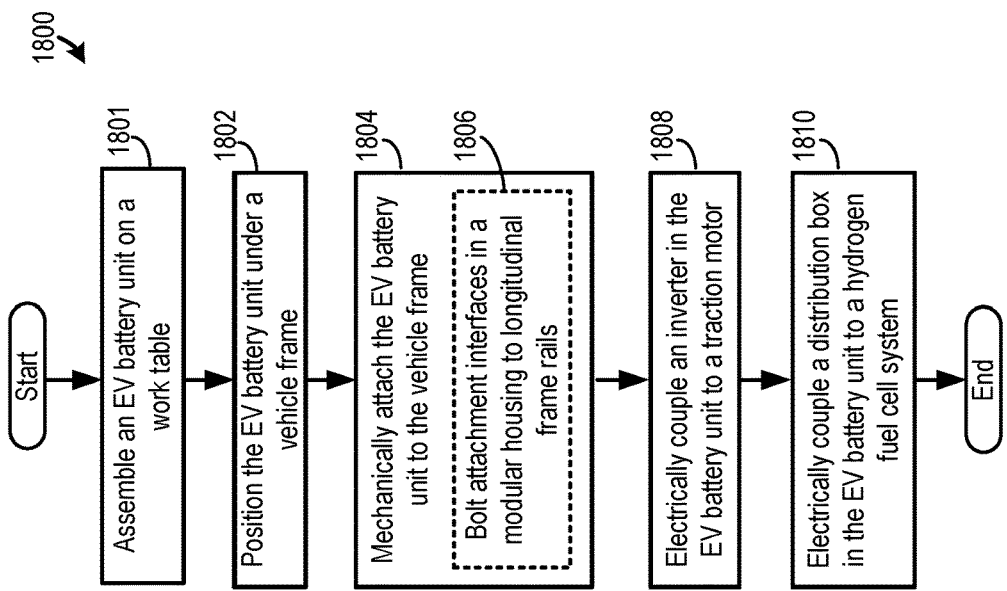
FIG. 18 shows a method for manufacture of an EV battery unit.

FIG. 1 shows an example of a vehicle designed with modular electric propulsion assemblies. FIG. 2 shows a detailed illustration of the vehicle and electric propulsion assemblies, depicted in FIG. 1. FIG. 3 shows a bottom view of the traction battery assembly and other associated system which are included in the vehicle depicted in FIG. 2. FIG. 4 shows the electronic architecture for electric propulsion assemblies that allows the system to achieve a high level of adaptability. FIGS. 5-11 show different views of a first example of a modular EV system which facilitates rapid and efficient installation of batteries and corresponding electric distribution components in an EV. FIGS. 12-17 show different views of a second example of a modular EV battery unit that enables the EV to achieve a higher level of adaptability in comparison to previous vehicle platforms. FIG. 18 shows method for installing an EV battery unit in a vehicle chassis.

FIG. 1 illustrates an EV 100 with a modular architecture. Specifically, the vehicle may be an all-electric vehicle which does not include an internal combustion engine. The EV 100 is illustrated as a heavy duty vehicle (e.g., a semi-truck) in FIG. 1. A heavy duty vehicle may be classified as any vehicle with a gross vehicle weight rating (GVWR) equal to or greater than 14,969 kilograms (kg). However, in other examples, the vehicle may take a variety of forms such as a light or medium duty vehicle, an on-road or off-road vehicle, and the like. As such, the vehicle may include multiple axles, one of which is a front axle 102 that may be steerable. A rear tandem axle 104 is further depicted in FIG. 1. At least one of the rear axles may be a drive axle, in one example. However, in other examples, numerous axle arrangements in the vehicle have been contemplated. For instance, the vehicle may include a different number of axles and/or axle types.

The EV 100 may have different electric propulsion assemblies which have a modular design. One or more of these assemblies may be included in an EV system 106. This modular design allows the propulsion unit configuration to be efficiently altered at a later stage in manufacturing than previous electric vehicle designs which have more design rigidity and are therefore less adaptable. Consequently, the vehicle's propulsion systems may be efficiently altered at a later stage in manufacturing to more efficiently meet the demands of specific end users. Thus, the configuration of the electric propulsion system may be efficiently tailored to achieve a wider variety of end-use design goals, thereby expanding customer appeal.

The electric propulsion assemblies in the EV 100 may include a hydrogen fuel cell assembly 108, a traction battery assembly 110, an electric distribution assembly 112, a traction motor 114 (e.g., motor-generator), and/or an electric accessory assembly 116. Electric energy may be transferred between the hydrogen fuel cell assembly, the traction battery assembly, the electric distribution assembly, the traction motor, and/or the electric accessory assembly based on vehicle operating conditions. For instance, during certain conditions when the traction batteries are below a threshold state of charge, the hydrogen fuel cell assembly may be used to recharge the traction batteries, thereby extending the vehicle's range.

The hydrogen fuel cell assembly 108 and the traction battery assembly 110 are electrically coupled to the electric distribution assembly 112 as denoted via arrows 118, 120, respectively. As such, electrically energy may be transferred between these assemblies. To expound, the hydrogen fuel cell assembly 108 and the traction battery assembly 110 are coupled to the electric distribution assembly 112 in parallel.

Connecting the hydrogen fuel cell assembly and the traction battery assembly to the electric distribution assembly in parallel permits the vehicle to be adapted for use as a hydrogen fuel cell electric vehicle (FCEV), a battery electric vehicle (BEV), or vehicle using both fuel cell and battery systems in tandem. In this way, the vehicle platform may be efficiently tailored for end-use design goals at a later stage in the manufacturing process, if desired. In the case of a vehicle using both fuel cell and battery assemblies, characteristics from both fuel cell and battery electric vehicles may be comingled to mitigate, or in some cases avoid, unwanted compromises between refueling/recharging characteristics and electric drive performance, for instance. For example, when the vehicle includes both the fuel cell and battery systems, the vehicle may use a wider infrastructure network for recharging or refueling. Consequently, the vehicle's applicability, range, and/or efficiency may be increased when both battery and fuel cell systems are incorporated in the vehicle.

The electric distribution assembly 112 is further electrically coupled to the traction motor 114, as denoted by arrows 115. A suitable traction motor may be used such as an alternating current (AC) motor that receives power from an inverter. It will be understood that the traction motor 114 is designed to deliver mechanical power to drive wheels (e.g., drive wheels in the rear drive axle assembly). A transmission, gearbox, and/or other suitable powertrain components may be used to accomplish this power transfer functionality.

The traction battery assembly 110 may include one or more batteries and/or other suitable energy storage devices such as capacitors. The battery assembly 110 may further include a heater and contactors that allow the individual battery packs to be heated and selectively disconnected. The batteries in the traction battery assembly 110 as well as the other batteries described herein may be constructed with a number of suitable chemistries. For instance, the batteries may include lithium ion batteries, lithium ion polymer batteries, nickel-metal hydride batteries, lithium air batteries, combination thereof, and the like.

The EV system 106 may further include electric accessories 122 which may be positioned in a cradle 124 of the vehicle in front of the cab 126 and are electrically coupled to the electric distribution assembly 112, denoted by arrows 128. These electric accessories 122 may include a power steering inverter, an air brake compressor, a cabin heater, a cabin cooler, a power steering pump, an on-board charger, combinations thereof, and the like.

The vehicle may include a control system 150 with a controller 152. The controller 152 may receive signals from sensors 154 coupled to various regions of the EV 100. For example, the sensors 154 may include wheel speed sensors, battery temperature sensors, battery state of charge (SOC) sensor, an accelerator pedal sensor, a brake pedal sensor, fuel cell voltage sensors, and the like. Upon receiving the signals from the various sensors, the controller processes the received signals, and employs various actuators 156 of vehicle components to adjust the components based on the received signals and instructions stored on the memory of controller. The controller may include a processor 158 and memory 160 that includes various circuits such as microprocessors, memory units, data buses, input-output ports, and the like. As such the memory of the controller may have instructions stored therein that, when executed by the processor, cause the controller to perform various methods and control techniques described herein. The memory may include known data storage mediums such as random access memory, read only memory, keep alive memory, combinations thereof, and the like. An input device 162 (e.g., control pedal(s) such as brake and/or accelerator pedals, a gear selector, an ignition key, combinations thereof, and the like) may further be in electronic communication with the controller 152. The controller 152 and associated control system may be used to control of any of the vehicle systems described herein with regard to FIGS. 2-17.

The hydrogen fuel cell assembly 108 may include multiple hydrogen storage tanks 140 and fuel cells 142. The fuel cells may be positioned above the storage tanks to enable efficient routing of the hydrogen to the fuel cells as well as fuel cell cooling. Further, the hydrogen fuel cell assembly 108 may be positioned vertically above the traction battery assembly to facilitate efficient installation and removal of each assembly, thereby increasing vehicle modularity.

An axis system 190 is provided in FIG. 1, as well as in FIGS. 2-3 and 5-17, for reference. The z-axis may be a vertical axis (e.g., parallel to a gravitational axis), the x-axis may be lateral axis (e.g., a horizontal axis), and/or the y-axis may be a longitudinal axis, in one example. However, the axes may have other orientations, in other examples. The terms in front and behind denote the relative position of a component along the longitudinal axis or an axis parallel to the y-axis. In this regard, a front side 130 and a rear side 132 of the vehicle are denoted in FIGS. 1 and 2.

FIG. 2 shows a detailed view of the EV 100 with exemplary illustrations of the vehicle system components such as the electric accessories 122 of the electric accessory assembly 116, the hydrogen fuel cell assembly 108, the electric distribution assembly 112, the traction motor 114, and the traction battery assembly 110. As shown, the electric accessories 122 are positioned in the cradle 124 in front of the cab 126. In this way, the accessories may be efficiently incorporated into the vehicle at a location that may impose less space constraints on other vehicle systems. It will be understood, that the cradle 124 may be positioned above the front axle 102.

The hydrogen fuel cell assembly 108 is positioned behind the cab 126 and in front of the tandem axle 104. In this way, the fuel cell assembly may be protected and is positioned in a location that interferes to a lesser degree with the attachment and/or sizing of a trailer that may be coupled to the vehicle during freight transport.

The traction battery assembly 110 is positioned vertically below the hydrogen fuel cell assembly 108 (e.g., directly below the hydrogen fuel cell assembly and behind the cab). Further, the traction battery assembly 110 may be positioned behind side bars 200, thereby permitting the vehicle operator to more easily enter the cab when compared to electric vehicles that position battery packs directly below the cab. Still further, the traction battery assembly 110 may be incorporated into a section 202 of the chassis 204. Positioning the traction battery assembly 110 into the chassis may allow for increased protection of the batteries from environmental degradation, such as degradation from road debris.

FIG. 3 shows a bottom view of the EV 100. The chassis 204 of the vehicle is again depicted which includes frame rails 300 (e.g., longitudinal rails) between which battery packs 302 in the traction battery assembly 110 are positioned. The traction motor 114 may further be positioned behind the battery packs 302 and between the frame rails 300. A motor inverter 304 and the junction box 306 may be positioned on opposing lateral sides 308, 310 of the chassis 204. A junction box 312 in the electric distribution assembly 112 and/or an air compressor 314 may also be positioned on one lateral side of the chassis. In this way, EV system 106 may achieve more even weight distribution when compared to vehicles with other battery pack arrangements. The vehicle's handing performance may be consequently increased. FIG. 3 further shows the electric accessories 122 in the cradle 124.

The battery packs 302 and junction box 312 may be included in an EV battery unit 350. The battery unit 350 is designed for efficient installation and removal specifically with regard to the electrically connecting the batteries and associated electronic componentry to the hydrogen fuel cell system and accessories in the front cradle. Examples of the battery unit are expanded upon herein.

The EV system 106 shown in FIGS. 1-3 is highly adaptable and permits the hydrogen fuel cell assembly to be quickly incorporated into and removed from the vehicle, as desired. In this way, the vehicle may be efficiently altered at a later stage in manufacturing to accommodate for the end-use design targets of the customers. For instance, the vehicle may be efficiently adapted for use as a BEV and/or FCEV.

FIG. 4 shows a circuit diagram of a vehicle system 400. It will be appreciated that the circuit diagram serves as an example of the circuitry in the EV system 106, depicted in FIGS. 1 and 2. The EV system 106 shown in FIG. 1 and the vehicle system 400 shown in FIG. 4 may therefore have at least some overlapping components that have a similar function and/or structure. Redundant description of these components is omitted for concision.

The vehicle system 400 may again include electric accessories 402 in an accessory assembly 404, an electric distribution assembly 406, a traction battery assembly 408, and a hydrogen fuel cell assembly 410. The electric accessories 402 may include a power-steering inverter 412 coupled to a power-steering pump 414, an air brake compressor 416, a cabin heater 418, a cabin air conditioning (AC) unit 420, an on board charger 422, an auxiliary power module 424, and/or the like. Each of the accessories include electrical ports 426 that enable connection between the accessories and a front junction box 428 (e.g., a front high voltage distribution box) included in the electric distribution assembly 406. The electric distribution assembly 406 may further include a rear junction box 430 (e.g., a rear high voltage distribution box). In some examples, the high voltage distribution boxes may distribute approximately 24 volts to the components which are electrically coupled thereto. However, other operating voltages have been contemplated.

The front junction box 428 is electrically coupled to the traction battery assembly 408 and the motor 432 and inverter 434 via bus 436 (e.g., a vehicle bus). Another bus 438 (e.g., a fuel cell bus) may be used to electrically couple the rear junction box 430 to the hydrogen fuel cell assembly 410. Each of these connections may be established via ports 440 in the junction box.

A fuel cell assembly contactor 442 may be positioned between the bus 436 and the bus 438 to allow the traction battery assembly 408 and motor 432 to be selectively electrically isolated from the fuel cell assembly 410.

The hydrogen fuel cell assembly 410 may include multiple fuel cells 444 that may be connected to DCDC converters 446 via contactors 448. To elaborate, a contactor may be positioned between each fuel cell and a DCDC bus. The DCDC converters 446 each include connectors 450 that are connected to ports 452 of the hydrogen fuel cell assembly 410. The use of the DCDC converters allows for the use of smaller cabling throughout the vehicle system as opposed to a more centralized solution. The ports 452 are connected to the ports 440 in the junction box associated with the fuel cell bus 438.

The traction battery assembly 408 may include multiple power packs 454. The power packs may be coupled in parallel and/or series. Further, a distribution box 456 or other suitable electrical arrangement may serve as an electrical interface between ports 458 of the traction battery assembly 408 and the power packs 454.

A battery chiller 460 may further be included in the traction battery assembly 408 or more generally in the vehicle system 400. The battery chiller 460 may be electrically coupled to the vehicle bus 436. The battery chiller 460 is designed to reduce the temperature of the battery packs.

Figure 5:
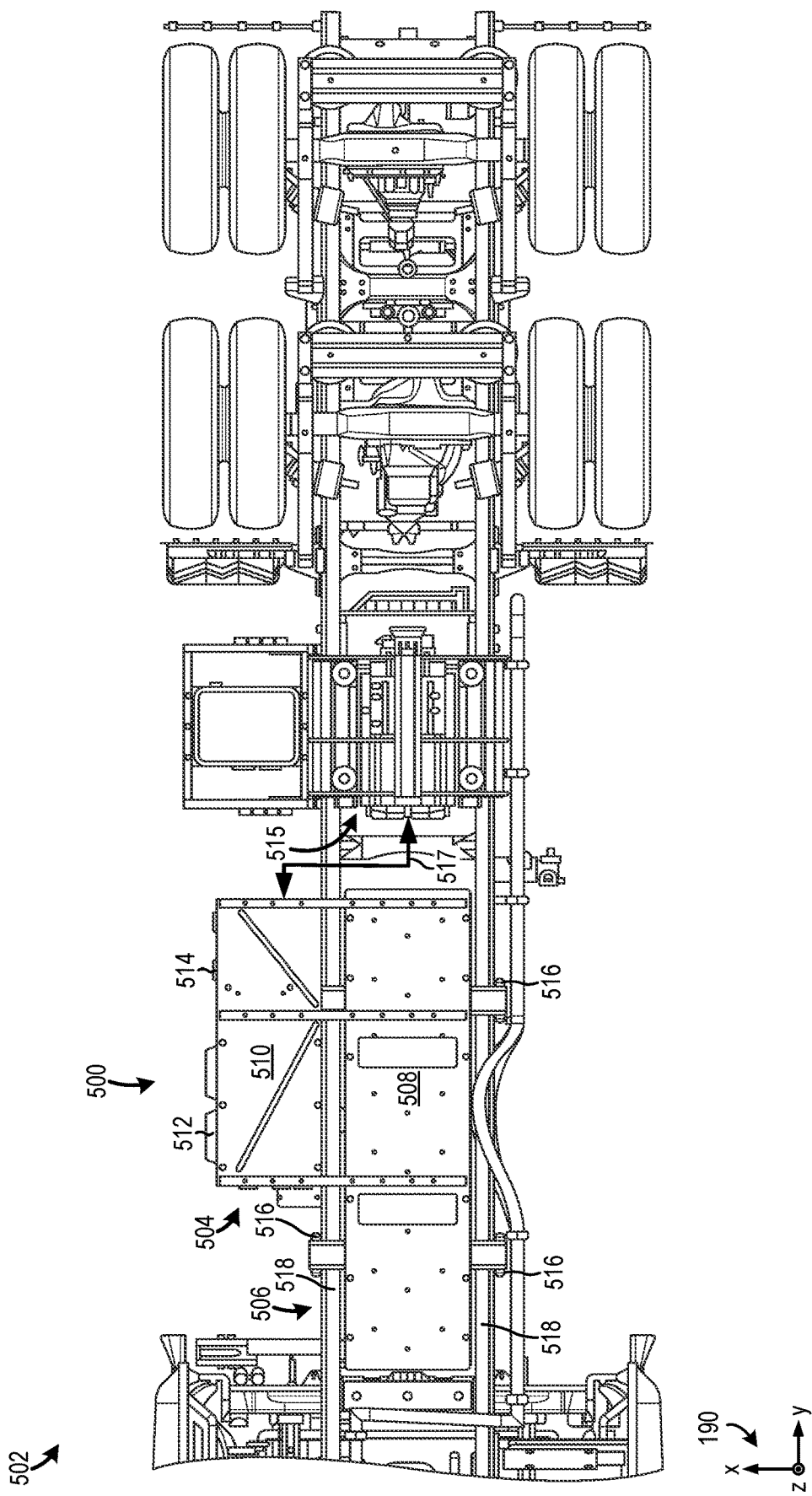
FIGS. 5-6 show an EV in which a modular EV battery unit is removably coupled to a vehicle chassis.

FIG. 5 shows a bottom view of an EV battery unit 500 in an EV 502. The EV battery unit 500 includes a modular housing 504 that is removably coupled to a vehicle chassis 506.

The modular housing 504 includes a central section 508 that may form a cradle for multiple batteries, that are described in greater detail herein. The modular housing 504 may further include a lateral section 510 that has a battery cooler 512 and/or an inverter 514 positioned thereon. The battery cooler 512 and the inverter 514 are electrically coupled to the batteries to enable the system to be pre-wired to facilitate efficient installation and removal of the modular EV system. The inverter 514 may further be electrically coupled to a traction motor 515 as denoted by arrows 517.

The modular housing 504 includes frame attachment interfaces 516 that are removably coupled to longitudinal frame rails 518 in the vehicle chassis 506. In this way, the EV system may be designed to rapidly attach to the frame rails. The frame attachment interfaces extend vertically with regard to the z-axis to facilitate simplified attachment of the battery unit housing to the vehicle chassis. The frame attachment interfaces 516 are elaborated upon herein.

Figure 6:
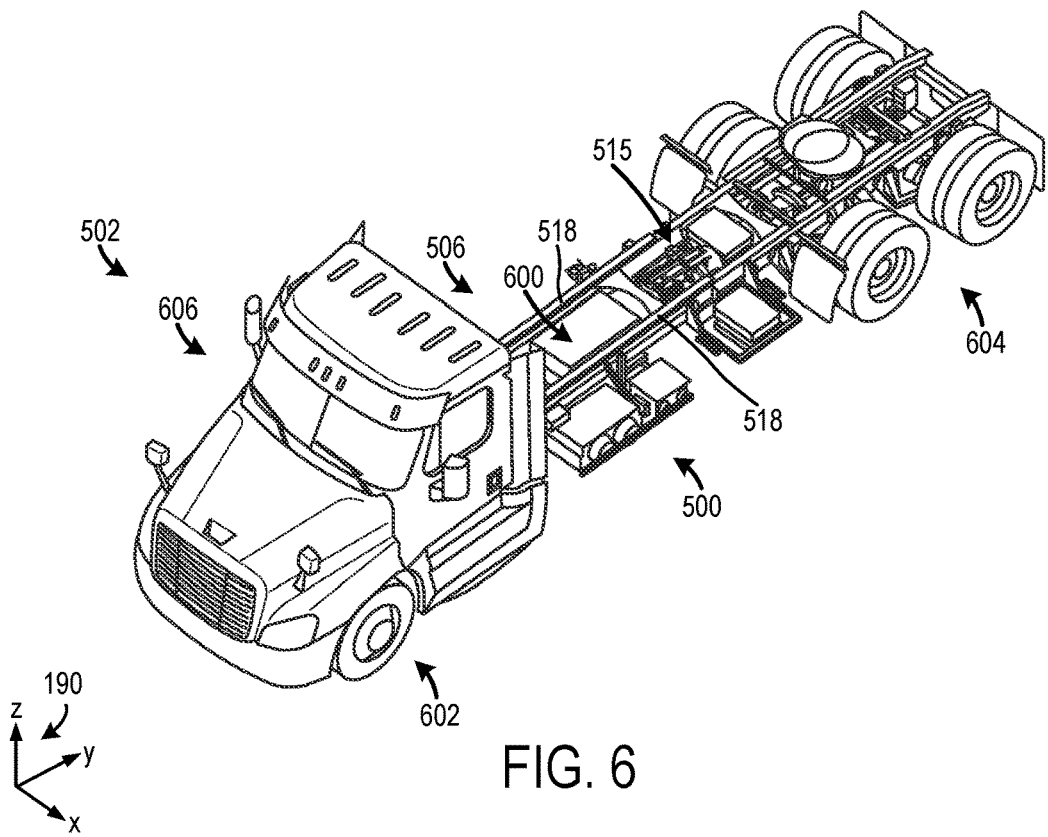

FIG. 6 shows a perspective view of the EV 502 with the EV battery unit 500 attached to the vehicle chassis 506. To elaborate, longitudinal frame rails 518 in the vehicle chassis 506 are depicted. At least a portion of the batteries 600 in the EV battery unit 500 are shown positioned laterally between the longitudinal frame rails 518. In this way, the batteries may be protected from external impacts, thereby decreasing the likelihood of battery degradation. The traction motor 515 is further shown in FIG. 6.

A front axle 602 and rear axle assembly 604 are further shown in FIG. 6. The EV battery unit 500 and the traction motor 515 is shown positioned between the front axle 602 and the rear axle assembly 604 (illustrated as a tandem axle). The rear axle may be a drive axle and the traction motor 515 may therefore provide motive power to one or more of the axles in the tandem axle. The EV battery unit 500 may be positioned underneath a hydrogen fuel cell assembly (e.g., the hydrogen fuel cell assembly 108, shown in FIGS. 1-2) with regard to the z-axis. In this way, the vehicle's compactness and packaging efficiency may be increased. The EV battery unit 500 may further be positioned behind a vehicle cab 606 to allow for a more streamlined battery unit installation.

Figure 7:
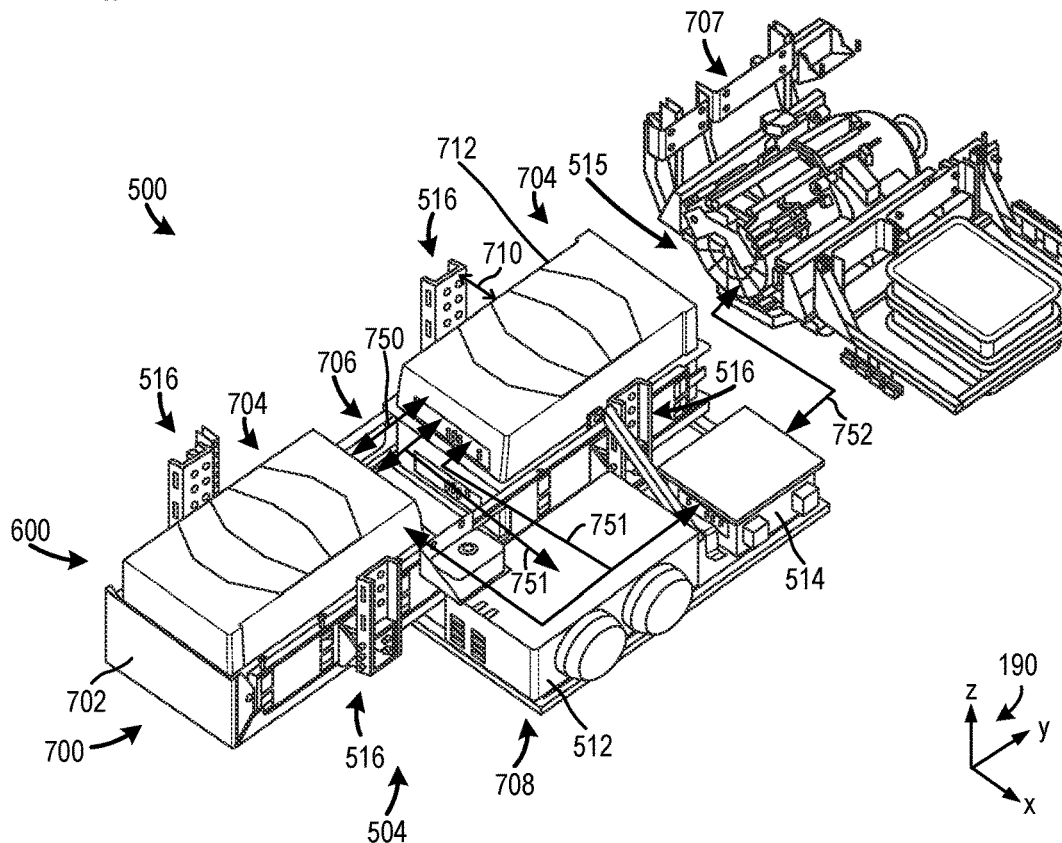
FIG. 7 shows a detailed view of the modular EV battery unit and a traction motor assembly, shown in FIGS. 5-6, that is decoupled from the vehicle chassis.

FIG. 7 shows a detailed perspective view of the EV battery unit 500 and the traction motor 515. The traction battery assembly includes a modular housing 504 with separate sections. To expound, the modular housing 504 include a central section 700 that may be formed of walls 702 which function as a cradle for the batteries 600. The batteries 600 may be formed in stacks 704 in which multiple batteries are arranged on top of one another. A gap 706 may be formed between the stacks of batteries in which wiring, that connects the batteries may be positioned. The wiring which electrically couples the batteries 600 is denoted via arrows 750.

The traction motor 515 may be positioned in a cradle 707 that is profiled to attach to the vehicle chassis 506, shown in FIG. 6. In this way, the motor may be supported and rapidly installed in the EV. For instance, motor may be placed between the longitudinal frame rails and removably coupled thereto.

A lateral section 708 may further be included in the modular housing 504. The battery cooler 512 may be positioned on the lateral section 708 along with the inverter 514. The frame attachment interfaces 516 in the modular housing 504 are further shown in FIG. 7. The frame attachment interfaces 516 may include openings sized to receive bolts that allow the battery unit 500 to be mechanically attached to the vehicle chassis 506, shown in FIG. 6. The frame attachment interfaces 516 may further be removably attached to the central section 700 of the modular housing 504.

Gaps 710 may be formed between the frame attachment interfaces 516 and sides 712 of the batteries 600. The gaps 710 may be sized to receive the vehicle's longitudinal frame rails (e.g., frame rails 518, shown in FIG. 6). As such, the longitudinal frame rails may extend through the gaps to enable the upper batteries in the battery stack to be positioned between the frame rails, thereby increasing the system's packaging efficiency.

The electrical connections between the batteries 600, the cooler 512, and the inverter 514 are denoted via arrows 751. The electrical connection between the inverter 514 and the traction motor 515 is denoted by arrows 752. These connections may be established by wires, electric interface, and the like. Wiring the batteries to the inverter and cooler within the battery unit enable the unit to be rapidly installed and electrically connected to the corresponding components.

Figure 8:
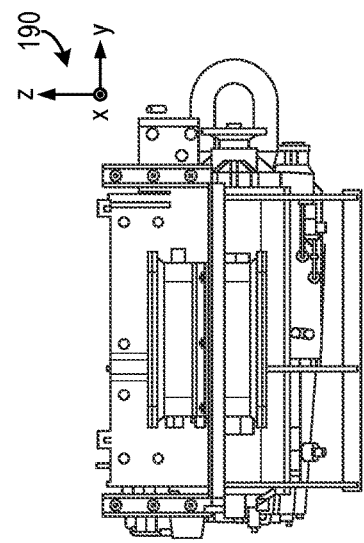
FIGS. 8-9 show a side view and a top view, respectively, of the modular EV battery unit and a traction motor assembly, depicted in FIGS. 5-6.
Figure 8:
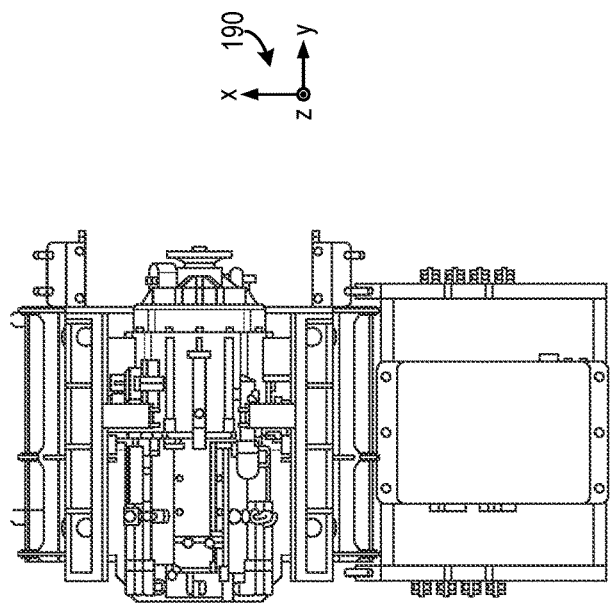
Figure 8:
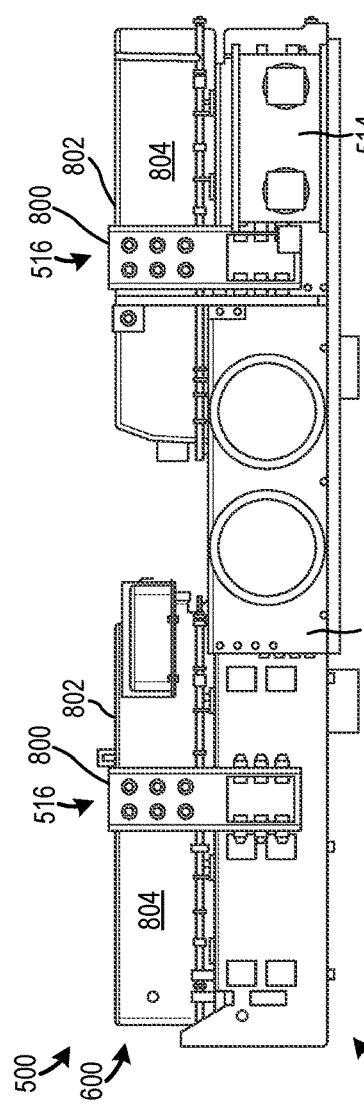

FIG. 8 shows a side view of the EV battery unit 500 and the traction motor 515. The batteries 600, housing 504 with the attachment interfaces 516, the cooler 512, and the inverter 514 are further shown in FIG. 8. Top surfaces 800 of the attachment interfaces 516 may have a higher vertical position along the z-axis when compared to top surfaces 802 of the upper batteries 804 in the battery stacks.

Figure 9:
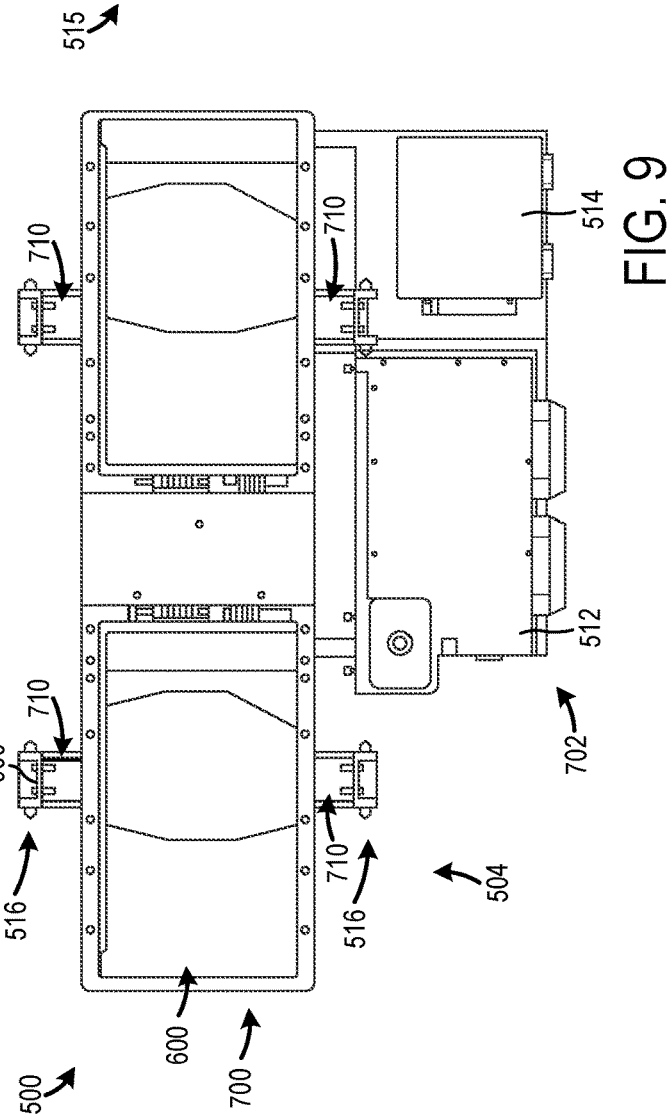

FIG. 9 shows a top view of the EV battery unit 500 and the traction motor 515. The batteries 600 residing in the central section 700 of the housing 504 are further shown in FIG. 9. The cooler 512 and the inverter 514 which reside on the lateral section 708 of the housing 504 are further shown in FIG. 9. The attachment interfaces 516 are further illustrated in FIG. 9 along with the gaps 710. The attachment interfaces 516 may include u-beam sections 900 that allow the interfaces to achieve a desired strength to weight ratio while also permitting streamlined attachment to the rails in the vehicle chassis.

Figure 10:
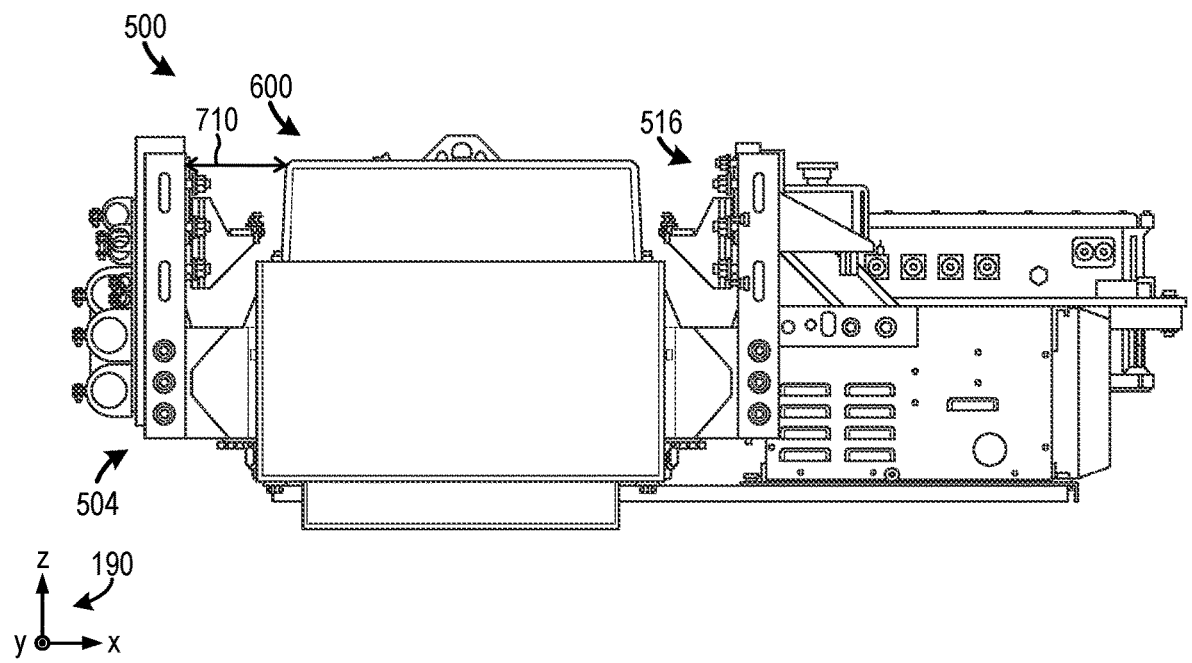
FIG. 10 shows a rear view of the modular EV battery unit, depicted in FIGS. 5-6.

FIG. 10 shows a rear view of the EV battery unit 500. The batteries 600 are again depicted in FIG. 10. The batteries 600 may be arranged laterally between the attachment interfaces 516 in the housing 504. The gap 710 between the attachment interfaces 516 and the batteries 600 is again illustrated. As previously discussed, the longitudinal rails in the vehicle chassis may fit into the gap to permit the vehicle system to achieve greater compactness.

Figure 11:
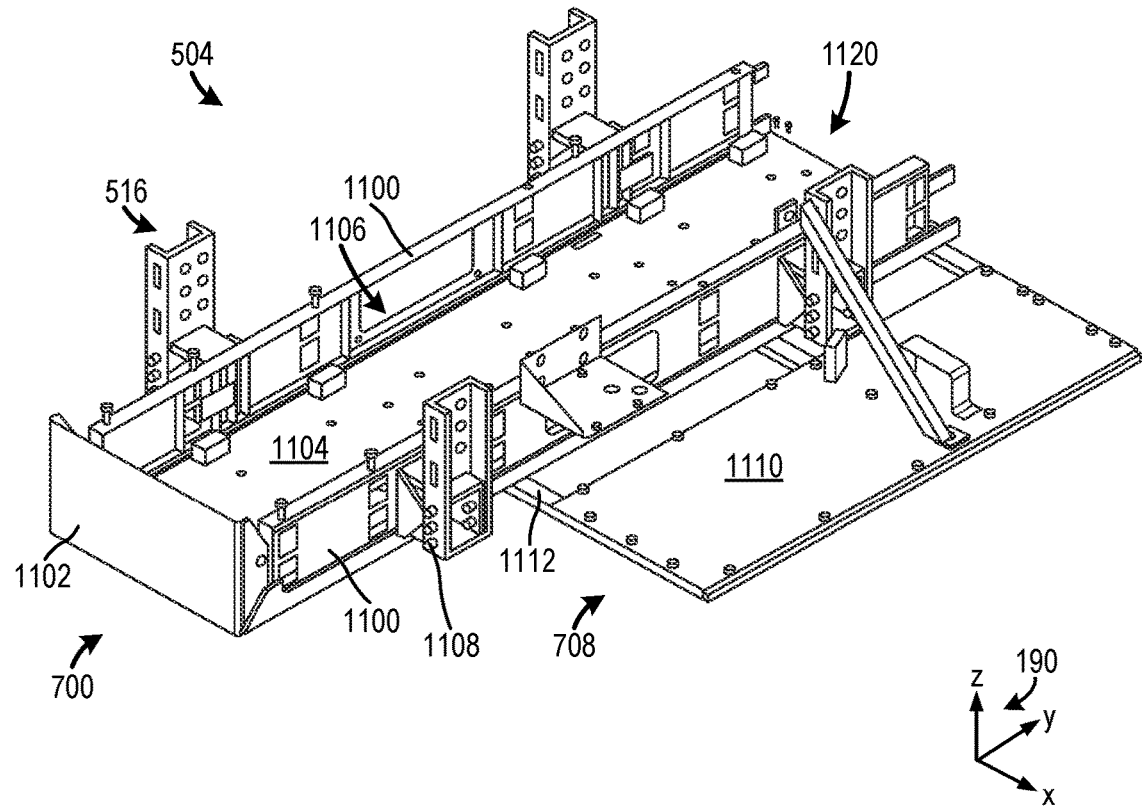
FIG. 11 shows a perspective view of a modular housing that is included in the modular EV battery unit, depicted in FIGS. 5-6.

FIG. 11 shows a detailed view of the modular housing 504 with the batteries, the cooler, and the inverter removed to reveal the geometry of the housing. The central section 700 and the lateral section 708 of the housing 504 are illustrated in FIG. 11. Side walls 1100, a front wall 1102, and a lower wall 1104 of the central section 700 form a cradle 1106 for the batteries to fit therein. In this way, the batteries may be secured in the housing which decreases the likelihood of unwanted battery degradation from environmental factors such as impacts from road debris, for instance.

The frame attachment interfaces 516 may be removably attached to the side walls 1100 via bolts 1108 and/or other suitable attachment devices. Laterally opposing frame attachment interfaces may have similar longitudinal positions for more even load distribution, when attached to the vehicle chassis.

The lateral section 708 may include a bottom wall 1110 that allows the cooler and the inverter to reside thereon. Further, beams 1112 may extend between the central section 700 and the lateral section to support the cooler and inverter.

The central section 700 may be open at a rear end 1120 to facilitate efficient battery installation. However, other profiles of the central housing section may be used in other examples.

Figure 12:
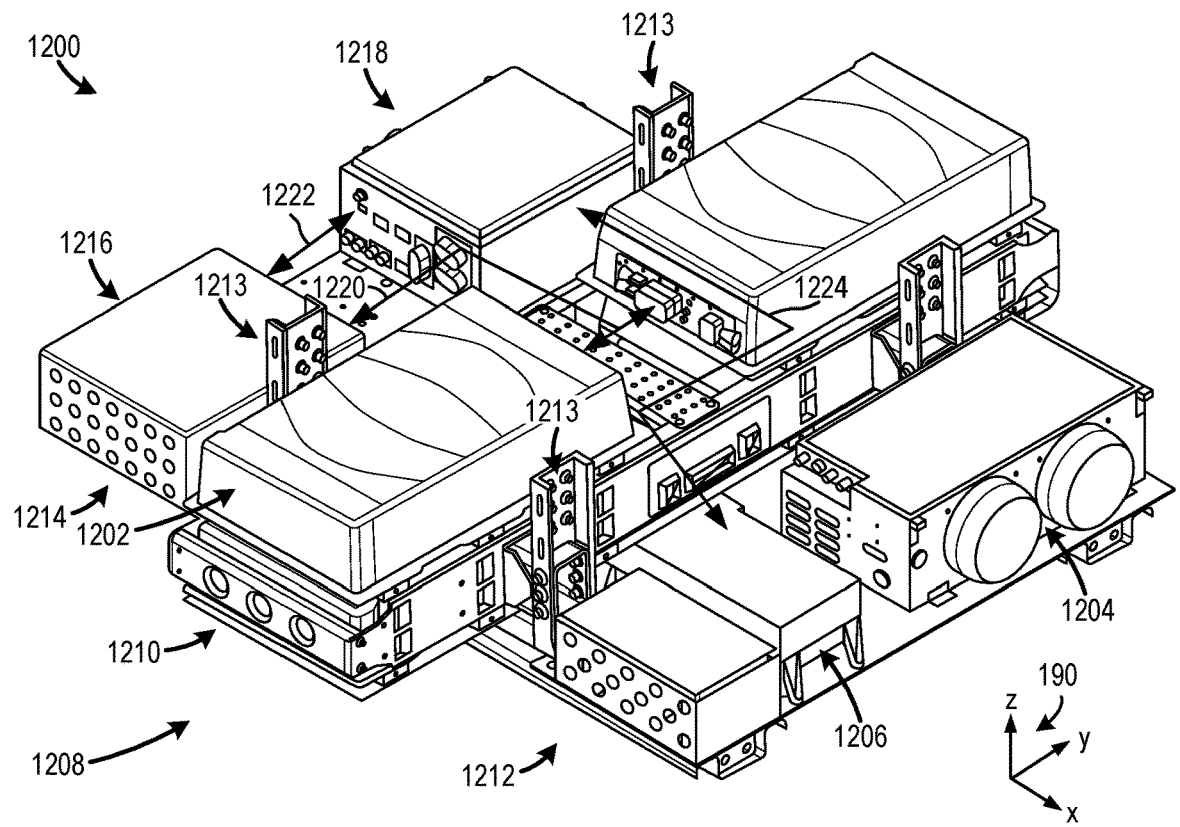
FIGS. 12-13 show different perspective views of another example of a modular EV battery unit.
Figure 13:
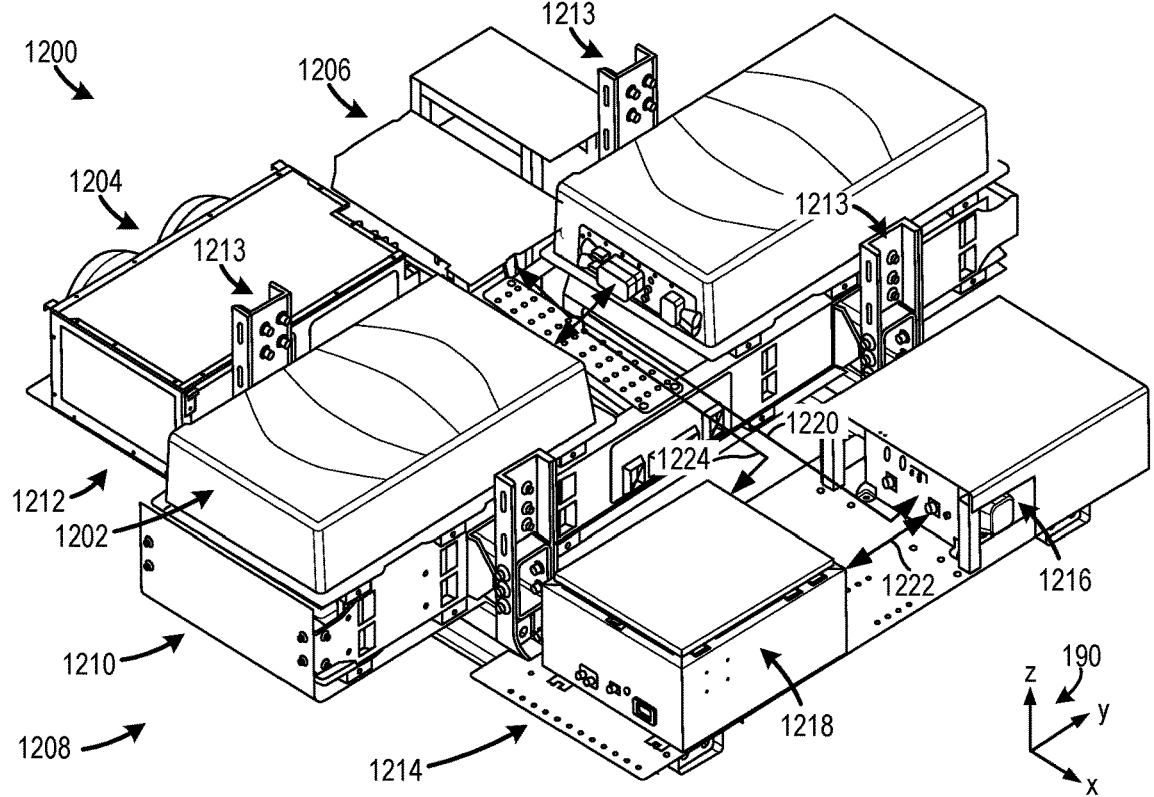

FIGS. 12 and 13 show another example of an EV battery unit 1200. The EV battery unit 1200 depicted in FIG. 12 may be included in any of the vehicle systems described herein. Further, the EV battery unit 500, shown in FIGS. 5-11, and the EV battery unit 1200 may have some components with similar structure and/or function. For instance, the EV battery unit 1200 again includes batteries 1202, a cooler 1204, and an inverter 1206 with a modular housing 1208 that has a central section 1210, a first lateral section 1212, and attachment interfaces 1213. Repeated descriptions of these overlapping EV battery unit components are omitted for brevity.

The modular housing 1208 further includes a second lateral section 1214 with a first distribution box 1216 and a second distribution box 1218 positioned thereon. The first distribution box 1216 (e.g., the distribution box 456, shown in FIG. 4) may be electrically connected to the batteries 1202, with such connections denoted via arrows 1220. The second distribution box 1218 (e.g., the distribution box 430, shown in FIG. 4) may be electrically coupled to the first distribution box 1216, as denoted via arrows 1222, and may be designed to electrically couple to the hydrogen fuel cell assembly (e.g., the hydrogen fuel cell assembly 410, shown in FIG. 4) and/or vehicle accessories. The second distribution box 1218 may further be electrically coupled to the inverter 1206 as denoted by arrows 1224. The inverter 1206 may again be designed to electrically couple to a traction motor. To achieve this electrical connection as well as the other electrical connections described herein one or more electrical interfaces with components such as outlets, plugs, wires, wiring harnesses, bus bars, combinations thereof, and the like.

FIG. 13 further shows a portion attachment interfaces 1213 positioned laterally between the batteries 1202 and the cooler 1204 and the inverter 1206. Likewise, another portion of the attachment interfaces 1213 are positioned laterally between the batteries 1202 and the distribution boxes 1216 and 1218. In this way, the unit's compactness may be increased and the cooler, inverter, and distribution boxes may achieve a higher vertical position in the vehicle to decrease the likelihood of component degradation from road debris, if so desired. However, other attachment interface positions have been contemplated.

Figure 14:
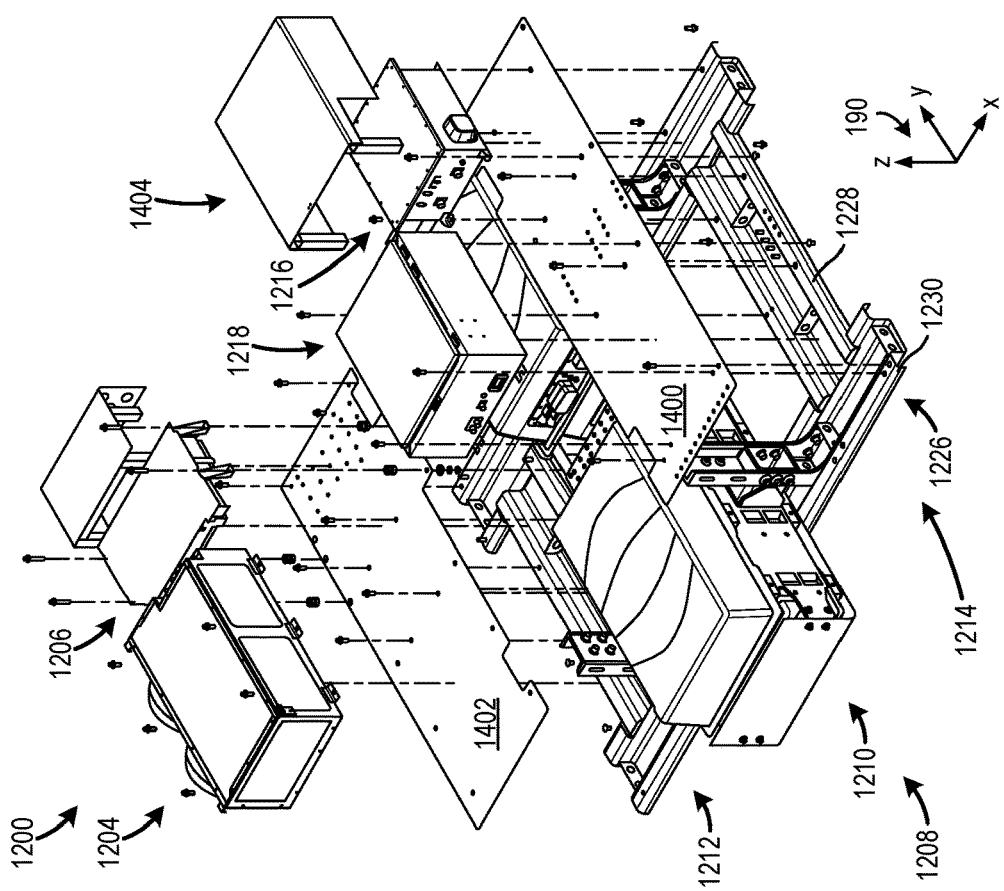
FIG. 14 shows an exploded view of the modular EV battery unit, depicted in FIGS. 12-13.

FIG. 14 shows a partially exploded view of the EV battery unit 1200. The first and second distribution boxes 1216 and 1218 are positioned above the second lateral section 1214 of the housing 1208. The cooler 1204 and the inverter 1206 are positioned above the first lateral section 1212 of the housing 1208. A support frame 1226 with lateral beams 1228 and longitudinal beams 1230 are positioned under the lower wall 1400 of the second lateral section 1214 and a lower wall 1402 of the first lateral section 1212. The batteries 1202 are again shown positioned in a cradle of the central section 1210. Positioning the batteries in the central housing and the inverter and cooler on one lateral side of the housing while positioning the distribution boxes 1216 and 1218 on the opposing side of the housing permits more even mass distribution of the battery unit. Consequently, the vehicle's handling performance may not be substantially impacted by the addition of the battery unit to the vehicle chassis. The walls 1400 and 1402 may have a substantially flat upper surface to enable the battery unit components to be easily positioned thereon.

A cover 1404 may be provided to protect the distribution box 1216. In this way, the box may be further protected from environmental conditions. However, in other examples, the cover 1404 may be omitted from the battery unit.

Figure 15:
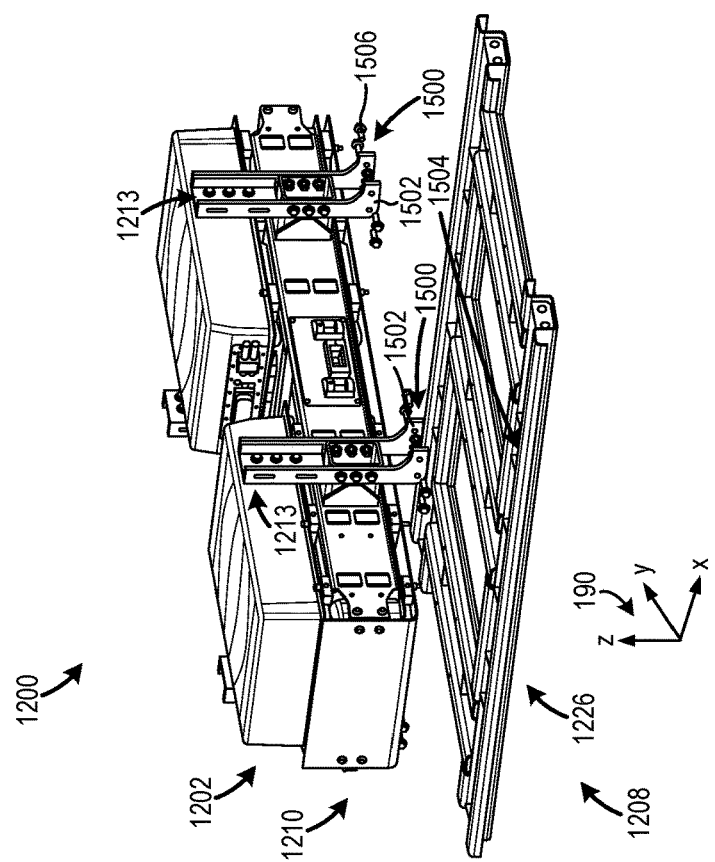
FIG. 15 shows a partially exploded view of the EV battery unit, depicted in FIGS. 12-13.

FIG. 15 shows a partially exploded view of the EV battery unit 1200 with the cooler, the distribution boxes, and the inverter removed to reveal the underlying housing structure. The central section 1210 of the housing 1208 is again shown containing the batteries 1202. The central section 1210 is positioned above the support frame 1226 and designed to coupled thereto when assembled. To elaborate, lower sections 1500 of the attachment interfaces 1213 may be profiled to attach to the support frame 1226. Specifically, extensions 1502 the attachment interfaces 1213 may be sized to mate with recesses 1504 in the support frame 1226. Bolts 1506 and/or other suitable attachment interfaces may be used to removably attach the attachment interfaces to the support frame.

Figure 16:
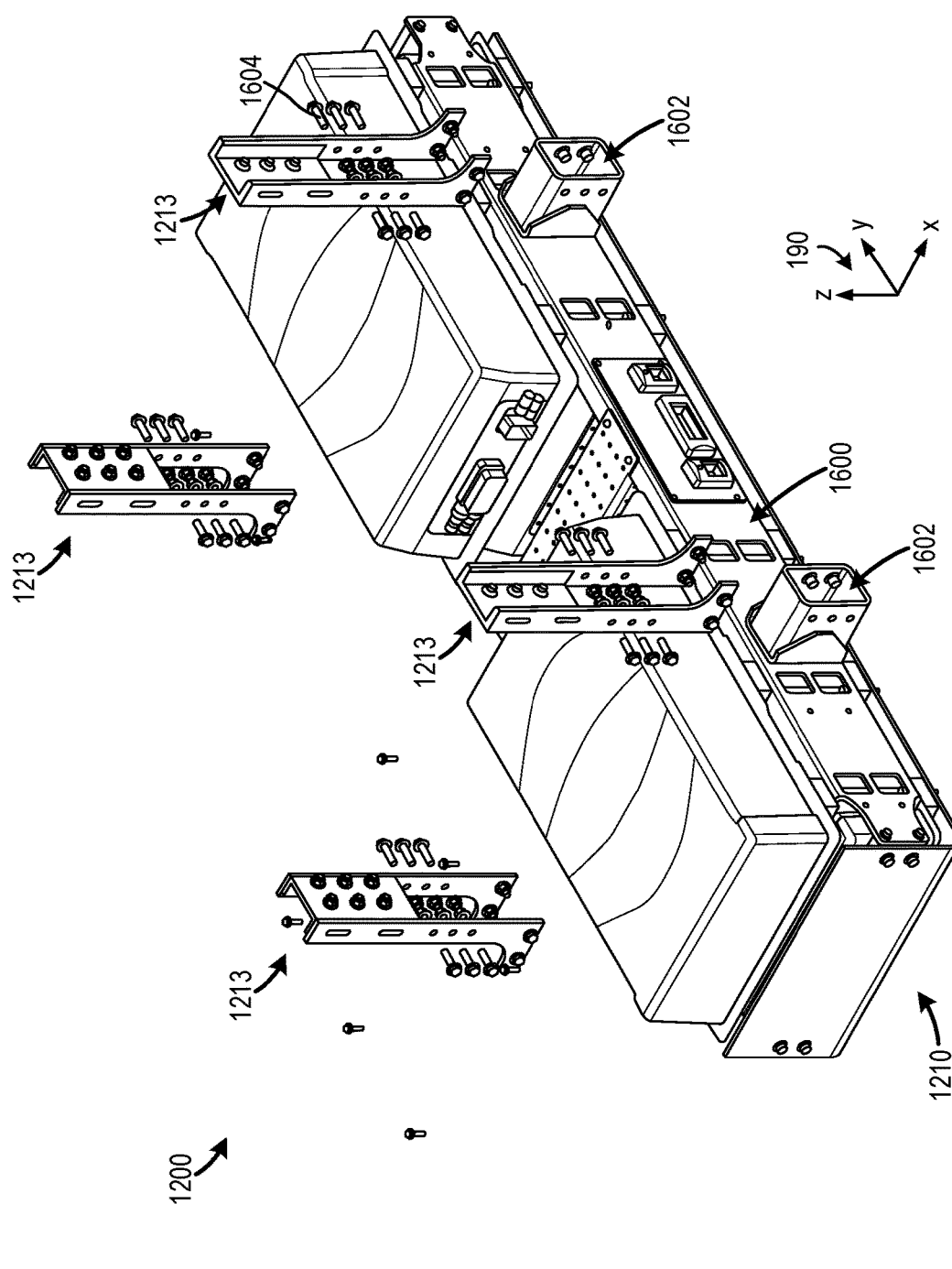
FIG. 16 shows another partially exploded view of the EV battery unit, depicted in FIGS. 12-13, with a portion of the frame attachment interfaces are decoupled from the unit's housing.

FIG. 16 shows another partially exploded view of the EV battery unit 1200 with the attachment interfaces 1213 decoupled from lateral walls 1600 of the central section 1210 of the housing 1208. The lateral walls 1600 may specifically include lateral mounts 1602 that allow the attachment interfaces to attach thereto. The lateral mounts 1602 may take the form of rectangular tubing, although other suitable constructions have been contemplated. Bolts 1604 or other suitable attachment techniques may be used to mechanically couple the attachment interfaces 1213 to the lateral mounts 1602.

Figure 17:
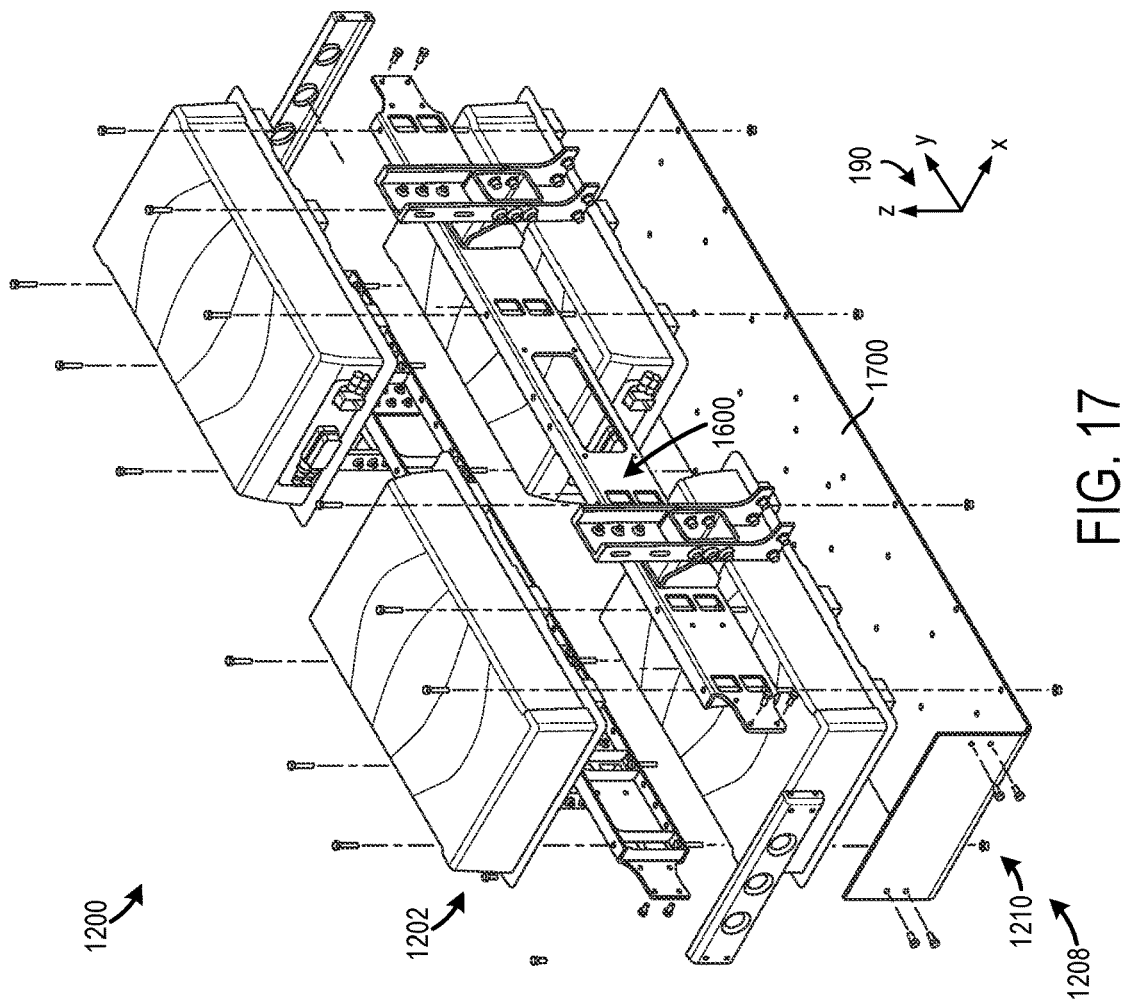
FIG. 17 shows another partially exploded view of the EV battery unit, depicted in FIGS. 12-13.

FIG. 17 shows yet another exploded view of the EV battery unit 1200. To expound, the batteries 1202 are decoupled from the central section 1210 of the housing 1208 in FIG. 17 to reveal the profile of these components. Further, the lateral walls 1600 are decoupled from the lower wall 1700 and the stacks of batteries 1202. The batteries 1202 may have a substantially similar construction to simplify manufacturing and installation, in one example. However, in other examples, at least a portion of the batteries may have different profiles. As illustrated, the lateral walls 1600 may be removably attached to the lower wall 1700. However, the lateral walls and the lower walls may form a monolithic structure, in other embodiments.

FIG. 18 shows a method 1800 for installation of a traction battery and motor assembly. The method 1800 may be used to install any of the traction battery and motor assemblies described above with regard to FIGS. 1-3 and 5-17. However, in other examples, the method may be install other suitable traction battery and motor assemblies. The method may be implemented via machines, installation personnel, combinations thereof, and the like. As such, at least a portion of the steps may be automated, in one example. Additionally or alternatively, at least a portion steps may be manually carried out by factory personnel.

At 1801, the method includes assembling the EV battery unit on a work table at a location spaced away from the vehicle. In this way, the sub-systems associated with the batteries may be constructed as a single unit for efficient vehicle installation. Assembling the EV battery unit may include attaching the batteries to a cradle in a central section of the housing, attaching the distribution boxes to a first lateral housing section, and/or attaching the cooler and inverter to a second lateral housing section. Assembling the EV battery unit may further include wiring the batteries to the distribution boxes, the cooler, and the inverter.

At 1802, the method includes placing the EV battery unit under a vehicle chassis. For instance, the battery unit may be wheeled, slid, or otherwise positioned under the vehicle chassis. In one use-case example, a forklift may be used to place the battery unit under the vehicle chassis. The structural continuity of the battery unit, allows the unit to be efficiently moved under the vehicle. The vehicle's manufacturing efficiency is consequently increased.

At 1804, the method includes mechanically attaching the EV battery unit to the vehicle chassis. Mechanically attaching the battery unit to the frame may include bolting the attachment interfaces in the modular housing to the longitudinal frame rails, at 1806. For instance, in the attachment interfaces, u-beam structures with opening therein may be bolted to longitudinal frame rails in the vehicle chassis.

Next at 1808, the method includes electrically coupling the inverter in the EV battery unit to the traction motor. For instance, wiring may be coupled to both the inverter and the EV battery. In this way, the EV battery unit may be quickly and efficiently attached to the traction motor.

Next at 1810, the method includes electrically coupling a distribution box in the EV battery unit to the hydrogen fuel cell system. Again, wiring, electrical interfaces, and the like may be used to electrically couple the distribution box to the fuel cells. In this way, the EV battery unit may be rapidly electrically attached to the hydrogen range extender. Method 1800 permits the battery unit to be efficiently mechanically attached to the vehicle chassis and electrically connected to the hydrogen fuel cell system without the need to wire internal componentry in the battery unit which has been previously wired, if so desired.

The technical effect of the EV battery unit installation method described herein is to facilitate more efficient manufacture of the EV platform than previous vehicles that do not form the batteries and associated componentry in a common unit. Another technical effect of the EV battery unit installation is to increase the modularity and adaptability of the vehicle platform.

FIGS. 1-3 and 5-17 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Elements directly or fixedly coupled to other elements may be referred to as such, in one example.

The invention will be further described in the following paragraphs. In one aspect, an electric vehicle (EV) battery unit is provided that comprises a modular housing including: a central section with plurality of batteries positioned therein; a first lateral section with a battery cooler that is designed to reduce a temperature of the plurality of batteries and an inverter that is positioned therein and electrically coupled to the plurality of batteries; a first frame attachment interface profiled to attach to a first longitudinal frame rail in an EV; and a second frame attachment interface profiled to attach to a second longitudinal frame rail in the EV; wherein the plurality of batteries are positioned laterally between the first and second frame attachment interfaces.

In another aspect, a method for installing a modular electric vehicle (EV) battery unit is provided that comprises placing the modular EV battery unit under a vehicle chassis; and mechanically attaching the modular EV battery unit to the vehicle chassis; wherein mechanical attaching the modular EV battery unit to the vehicle chassis includes attaching a first frame attachment interface to a first longitudinal frame rail and attaching a second frame attachment interface profiled to a second longitudinal frame rail; wherein the modular EV battery unit comprises a modular housing that includes: a central section with a plurality of batteries positioned therein; a first lateral section with a battery cooler that is designed to reduce a temperature of the plurality of batteries and an inverter that is positioned therein and electrically coupled to the plurality of batteries. In one example, the method may further comprise electrically coupling the inverter to a traction motor that is positioned behind the modular EV battery unit. In yet another example, the method may further comprise electrically coupling a distribution box to a hydrogen fuel cell system, wherein the distribution box is positioned on a second lateral section of the modular housing.

In yet another aspect, an electric vehicle (EV) system is provided that comprises an EV battery unit comprising: a modular housing including: a central section that forms a cradle for plurality of batteries positioned therein; a first lateral section with a battery cooler that is designed to reduce a temperature of the plurality of batteries and an inverter that is positioned therein and electrically coupled to the plurality of batteries; and a second lateral section with one or more distribution boxes positioned thereon and electrically coupled to the plurality of batteries and a traction motor; a first frame attachment interface removably mechanically attached to a first longitudinal frame rail in an EV; and a second frame attachment interface removably mechanically attached to a second longitudinal frame rail in the EV; and wherein at least a portion of the plurality of batteries are positioned laterally between the first and second longitudinal frame rails.

In any of the aspects or combinations of the aspects, the hydrogen fuel cell system may include a plurality of hydrogen storage tanks and fuel cells positioned behind a vehicle cab and above the first and second longitudinal frame rails.

In any of the aspects or combinations of the aspects, mechanically attaching the modular EV battery unit to the vehicle chassis may include bolting the first and second frame attachment interfaces to the first and second longitudinal frame rails, respectively.

In any of the aspects or combinations of the aspects, at least a portion of the plurality of batteries may be positioned laterally between the first and second longitudinal frame rails.

In any of the aspects or combinations of the aspects, the modular housing may further include a second lateral section with one or more distribution boxes that are electrically coupled to the plurality of batteries.

In any of the aspects or combinations of the aspects, the one or more distribution boxes may be designed to electrically couple to a hydrogen fuel cell assembly.

In any of the aspects or combinations of the aspects, the inverter may be designed to electrically couple to a traction motor.

In any of the aspects or combinations of the aspects, the one or more distribution boxes may be designed to distribute approximately 24 volts to the plurality of batteries, the hydrogen fuel cell assembly, and the traction motor.

In any of the aspects or combinations of the aspects, the traction motor may be positioned laterally between the first and second longitudinal frame rails.

In any of the aspects or combinations of the aspects, in the EV battery unit a first gap may formed between the first frame attachment interface and the plurality of batteries and sized to receive the first longitudinal frame rail; and a second gap may be formed between the second frame attachment interface and the plurality of batteries and sized to receive the second longitudinal frame rail.

In any of the aspects or combinations of the aspects, at least one of the plurality of batteries may be positioned laterally between the first longitudinal frame rail and the second longitudinal frame rail.

In any of the aspects or combinations of the aspects, the central section of the modular housing may include a plurality of walls that form a cradle for the plurality of batteries.

In another representation, an energy storage structure is provided that comprises a plurality of battery stacks positioned in a central cradle and plurality of electrical distribution components positioned laterally outward from the central cradle, wherein the electrical distribution components include a distribution box and an inverter designed to electrically couple to a traction motor.

Note that the installation methods described herein can be used with various vehicle system configurations. At least a portion of the installation method steps disclosed herein may be stored as executable instructions in non-transitory memory and may be carried out by machinery with controllers that include the memory as well as processing units, and the like. Likewise, the order of the installation steps is not necessarily required to achieve the features and advantages of the example embodiments described herein, but is provided for ease of illustration and description. One or more of the illustrated actions, operations and/or functions may be repeatedly performed depending on the particular strategy being used.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric vehicle (EV) battery unit, comprising:
   a modular housing including:
   a central section with plurality of batteries positioned therein;
   a first lateral section with a battery cooler that is designed to reduce a temperature of the plurality of batteries and an inverter that is positioned therein and electrically coupled to the plurality of batteries;
   a first frame attachment interface profiled to attach to a first longitudinal frame rail in an EV chassis; and
   a second frame attachment interface profiled to attach to a second longitudinal frame rail in the EV;
   wherein the plurality of batteries are positioned laterally between the first and second frame attachment interfaces and the first and second frame attachment interface extend in a vertical direction.

2. The EV battery unit of claim 1, wherein the modular housing further includes a second lateral section with one or more distribution boxes that are electrically coupled to the plurality of batteries.

3. The EV battery unit of claim 2, wherein the one or more distribution boxes are designed to electrically couple to a hydrogen fuel cell assembly.

4. The EV battery unit of claim 3, wherein the inverter is designed to electrically couple to a traction motor.

5. The EV battery unit of claim 4, wherein the one or more distribution boxes are designed to distribute approximately 24 volts to the plurality of batteries, the hydrogen fuel cell assembly, and the traction motor.

6. The EV battery unit of claim 4, wherein the traction motor is positioned laterally between the first and second longitudinal frame rails.

7. The EV battery unit of claim 1, wherein:
a first gap is formed between the first frame attachment interface and the plurality of batteries and sized to receive the first longitudinal frame rail; and
a second gap is formed between the second frame attachment interface and the plurality of batteries and sized to receive the second longitudinal frame rail.

8. The EV battery unit of claim 7, wherein at least one of the plurality of batteries is positioned laterally between the first longitudinal frame rail and the second longitudinal frame rail.

9. The EV battery unit of claim 1, wherein the central section of the modular housing includes a plurality of walls that form a cradle for the plurality of batteries.

10. An electric vehicle (EV) system, comprising:
an EV battery unit comprising:
a modular housing including:
a central section that forms a cradle for plurality of batteries positioned therein;
a first lateral section with a battery cooler that is designed to reduce a temperature of the plurality of batteries and an inverter that is positioned therein and electrically coupled to the plurality of batteries;
a second lateral section with one or more distribution boxes positioned thereon and electrically coupled to the plurality of batteries and a traction motor;
a first frame attachment interface removably mechanically attached to a first longitudinal frame rail in an EV; and
a second frame attachment interface removably mechanically attached to a second longitudinal frame rail in the EV;
wherein at least a portion of the plurality of batteries are positioned laterally between the first and second longitudinal frame rails.

11. The EV system of claim 10, wherein the one or more distribution boxes are designed to electrically couple to a hydrogen fuel cell system that is positioned vertically above the first and second longitudinal frame rails and behind a cab.

12. The EV system of claim 11, wherein the hydrogen fuel cell system includes a plurality of hydrogen storage tank positioned vertically below a plurality of fuel cells.

13. The EV system of claim 10, wherein the traction motor delivers mechanical power to a rear axle during drive operation.

14. The EV system of claim 13, wherein the traction motor is positioned longitudinally between the rear axle and the EV battery unit.

* * * * *